United States Patent
Jan (12)

(10) Patent No.: US 8,668,459 B2
(45) Date of Patent: Mar. 11, 2014

(54) TURBINE BLADE WALKING PREVENTION

(75) Inventor: Shihming Jan, Solana Beach, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 861 days.

(21) Appl. No.: 12/789,960

(22) Filed: May 28, 2010

(65) Prior Publication Data

US 2011/0293430 A1    Dec. 1, 2011

(51) Int. Cl.
*F01D 5/30* (2006.01)
*F01D 5/14* (2006.01)

(52) U.S. Cl.
USPC .......... 416/237; 415/173.1; 416/174

(58) Field of Classification Search
USPC ...... 416/219 R, 223 A, 223 R, 237, 238, 174; 415/170.1, 173.1
See application file for complete search history.

(56) References Cited

U.S. PATENT DOCUMENTS

| | | |
|---|---|---|
| 2,487,460 A | 11/1949 | Mauric |
| 2,494,960 A | 1/1950 | Pepper |
| 2,774,254 A | 12/1956 | Gerber |
| 3,108,182 A | 10/1963 | Gray et al. |
| 3,151,669 A | 10/1964 | Quenneville |
| 3,168,235 A * | 2/1965 | Valdi ............................. 415/220 |
| 4,252,035 A | 2/1981 | Cordner et al. |
| 4,750,862 A | 6/1988 | Barnes et al. |
| 5,431,542 A * | 7/1995 | Weisse et al. ............. 416/219 R |
| 5,772,400 A * | 6/1998 | Pellow ......................... 415/173.1 |
| 6,037,752 A | 3/2000 | Glennon |
| 6,059,532 A * | 5/2000 | Chen et al. ................. 416/223 A |
| 6,260,667 B1 | 7/2001 | Sugden |
| 6,338,609 B1 * | 1/2002 | Decker et al. ............. 415/173.1 |
| 6,652,235 B1 | 11/2003 | Keith et al. |
| 6,838,778 B1 | 1/2005 | Kandil et al. |
| 6,976,826 B2 | 12/2005 | Roy et al. |
| 7,351,039 B2 * | 4/2008 | Bachofner et al. ............ 416/228 |

OTHER PUBLICATIONS

Chinese Search Report for Application No. 201110140305.9 dated May 25, 2013.

* cited by examiner

*Primary Examiner* — Edward Look
*Assistant Examiner* — Jesse Prager
(74) *Attorney, Agent, or Firm* — Carlson, Gaskey & Olds

(57) ABSTRACT

A turbine assembly has a casing, a turbine ring and a blade. The blade has a root portion having an axially extending first shape, an airfoil attaching to the root portion and having a trailing edge and a radially outward tip. The tip has a first portion disposed in parallel to the axis of rotation for minimizing escape of air between the tip and the casing and a second portion extending aft from the first portion at an inward angle. The ring has a cut-out having a second shape mating with the first shape.

13 Claims, 2 Drawing Sheets

TURBINE BLADE WALKING PREVENTION

BACKGROUND OF THE INVENTION

A component in the turbine engine is the turbine wheel that extracts energy from the hot gas to deliver power. Traditionally the turbine wheel is made of two components, multiple blades and a disk. The blades are exposed to the hot gas stream to extract its energy and generate force to rotate the disk. The blades are commonly attached to the disk by an axially aligned, upside down, "Christmas tree" projection, or root, that fits in a mating, upside down "Christmas tree" cut-out in the disk. Other shaped mating projections and cut-outs are also known to mount turbine blades to turbine disk.

The turbine disk attaches to a shaft that may drive a compressor section that compresses air input to a burner for combustion therein, and a fan section to provide thrust for an aircraft or a generator to provide electrical power.

To keep the turbine blades axially aligned about the turbine disk during operation, a retention device is used to prevent the blades from being pushed out the disk cut-out. The retention device can have many different shapes depending on requirements but acts mainly as a lock to fix the blade in the disk.

SUMMARY OF THE INVENTION

According to an exemplar, a turbine assembly has a casing, a turbine ring and a blade. The blade has a root portion having an axially extending first shape, an airfoil attaching to the root portion and having a trailing edge and a radially outward tip. The tip has a first portion disposed in parallel to the axis of rotation for minimizing escape of air between the tip and the casing and a second portion extending aft from the first portion at an inward angle. The ring has a cut-out having a second shape mating with the first shape.

According to a further exemplar a turbine blade has a root portion having an axially extending first shape, an airfoil attaching to the root portion and having a trailing edge, and a radially outward tip having a first portion disposed in parallel to the axis of rotation for minimizing escape of air between the tip and a casing and a second portion extending aft from the first portion at an inboard angle.

According to a still further exemplar, a method for minimizing blade walking includes maintaining a first portion of an airfoil in parallel to a turbine casing, shaving a second portion of said airfoil such that the second portion extends aftwardly and inboardly at an angle from the first portion such that blade walking is minimized.

These and other features of the present invention can be best understood from the following specification and drawings, the following of which is a brief description.

DETAILED DESCRIPTION OF THE PREFERRED EMBODIMENT

Figure 1:
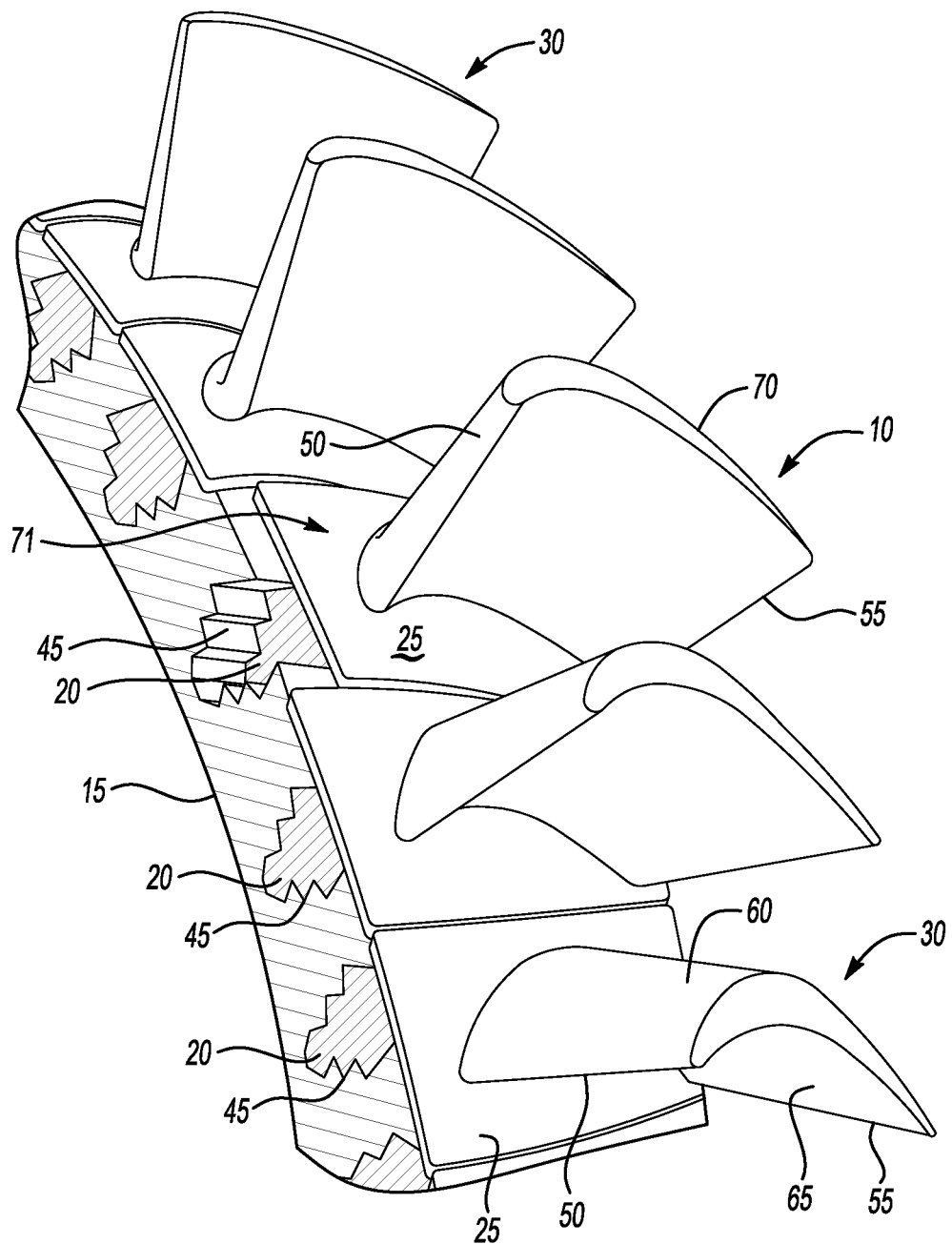
FIG. 1 shows a perspective view of a plurality of turbine blades disposed in a turbine ring.
Figure 2:
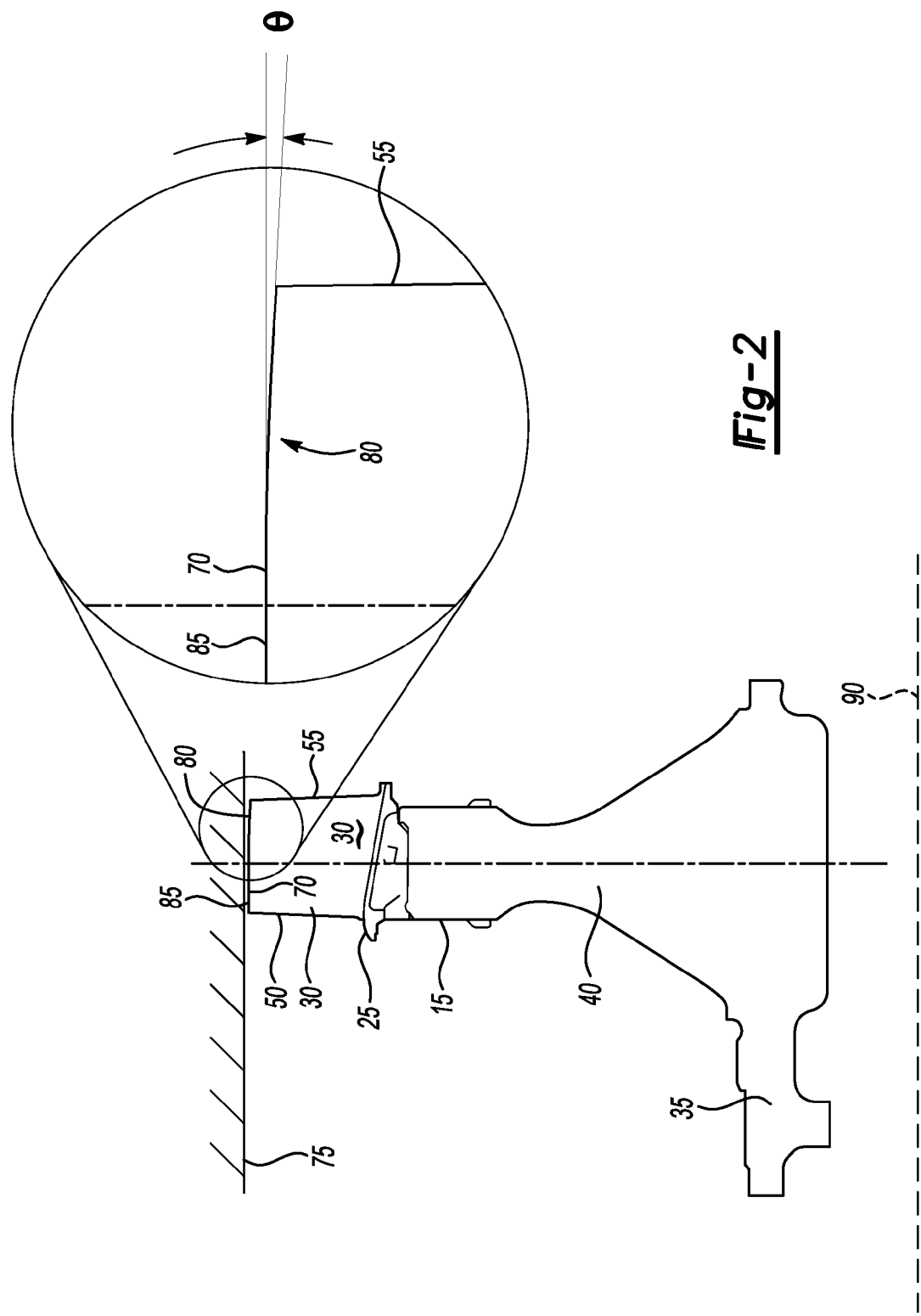
FIG. 2 shows a side, cut away view of a turbine blade of FIG. 1.

Referring to FIGS. 1 and 2, a perspective view of a plurality of turbine blades 10 in a turbine ring 15 embodied herein is shown. Each turbine blade 10 includes a root portion 20 that is shaped like an upside down Christmas tree, a base 25 and an airfoil 30. Each turbine blade 10 is disposed in the turbine ring 15 that attaches to a shaft (see FIG. 2) 35 by conventional means (shown schematically as 40). The turbine ring 15 has a plurality of cut-outs 45 in a shaped like an upside down Christmas tree to mate with the root portion 20 of the turbine blade 10. Though a Christmas tree shape is shown herein for the root portion 20 and the mating cut-outs 45, other mating shapes are contemplated herein. Each base 25 is relatively flat, though it may slope downwardly aft (e.g., towards the right on the drawing see FIG. 2). Each base 25 abuts a base 25 of each adjacent turbine blade 10. Though a turbine blade 10 is described herein other types of blades are contemplated herein.

The air foils 30 each have a shape (leading edge 50, trailing edge 55, suction side 60 and pressure side 65) to react to rapidly expanding gas to turn the turbine ring 15 to provide work energy. The air foils 30 each have an outer tip 70 that is in parallel to a turbine casing (not shown in FIG. 1—see FIG. 2). The outer tip 70 is normally close to the turbine casing 75 to minimize the escape of gas between the tip 70 and the turbine casing 75.

As shown in FIG. 1, turbine blade 71, which is shown for illustrative purposes only, has "walked" axially aft. That is, the turbine blade 71 root 20 has shifted axially towards the trailing edge 55 when rotated about an axis of rotation. Turbine blades may be prevented from "walking" by means of a stiffer or heavier retention ring (not shown) but such rings are heavy and may require complex attachment apparatus. "Walking" may be caused by shaft 35 eccentricities that cause some turbine blades 10 to strike or rub against the turbine casing 75. The striking and particularly rubbing forces may cause tangential forces that "walk" the turbine blade 10 aft.

Referring now to FIG. 2, a side view of a turbine blade 10 is shown. A first portion 80 of the tip 70 is shaved at an angle θ downwardly (or inboardly towards an axis of rotation 90) aft to the trailing edge 55 of the airfoil 30. A second portion 85 of the tip 70 is unshaved to retain closeness to the turbine casing 75 to minimize the escape of gas around the tip 70. The second portion 85 of the tip 70 is parallel to the turbine casing 75 and to an axis of rotation 90 of the blade 10.

In the instant example, the blade is shaved by grinding, cutting or chemical processing or the like for an existing blade or molding or the like for a new blade, from a radial center line of the blade to the trailing edge thereof at an inward angle θ, towards the blade root 20, of about 2.0 degrees for the instant example. However, other angles extending from other points on the tip that minimize walking while minimizing the escape of gas around the tip 70 are contemplated herein.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. An assembly comprising:
   a casing;
   a blade, said blade including:
      a root portion including an axially extending first shape; and
      an airfoil attaching to said root portion and including:
         a trailing edge; and
         a radially outward tip including a first portion disposed in parallel to said axis of rotation for minimizing escape of air between said tip and said casing and a second portion extending aft from said first portion at an inboardly directed angle, said inboardly directed angle is about 2 degrees; and a ring including a cut-out having a second shape mating with said first shape.

2. The assembly of claim 1 wherein said first portion and said second portion are divided by a radial center line extending through said blade.

3. The assembly of claim 1 wherein said second portion extends to said trailing edge of said airfoil.

4. A turbine blade comprising:

a root portion including an axially extending first shape; and an airfoil attaching to said root portion and including:

a trailing edge; and a radially outward tip including a first portion disposed in parallel to said axis of rotation for minimizing escape of air between said tip and a casing and a second portion extending aft from said first portion at an inward angle, said inward angle is about 2 degrees.

5. The turbine blade of claim 4 wherein said first portion and said second portion are divided by a radial center line extending through said blade.

6. The turbine blade of claim 5 wherein said second portion extends to said trailing edge of said airfoil.

7. A method for minimizing blade walking in a turbine ring comprising:

maintaining a first portion of an airfoil of a blade in parallel to a turbine casing, said blade including a root portion including an axially extending first shape configured to mate with a ring, the ring including a second shape; and shaving a second portion of said airfoil such that said second portion extends aftwardly and inboardly at an angle from said first portion such that axial shifting of said blade is minimized when said blade is rotated about an axis of rotation. wherein said angle is about 2 degrees.

8. The method of claim 7 further comprising:

defining said first portion and said second portion by a radial center line extending through said blade.

9. The method of claim 7 wherein said second portion is shaved to a trailing edge of said airfoil.

10. The assembly of claim 1 wherein airfoil extends in a direction generally parallel to said first shape.

11. The assembly of claim 1 wherein said inboardly directed angle includes a constant slope and said second portion is localized at the tip of said airfoil.

12. The turbine blade of claim 4 wherein airfoil extends in a direction generally parallel to said first shape.

13. The turbine blade of claim 4 wherein said inward angle includes a constant slope and said second portion is localized at the tip of said airfoil.

* * * * *